(12) United States Patent
Ishii et al.

(10) Patent No.: US 9,493,359 B2
(45) Date of Patent: Nov. 15, 2016

(54) APPARATUS FOR PRODUCING TRICHLOROSILANE

(75) Inventors: Toshiyuki Ishii, Yokkaichi (JP); Hideo Ito, Kuwana (JP); Yuji Shimizu, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 912 days.

(21) Appl. No.: 12/226,204

(22) PCT Filed: Oct. 24, 2007

(86) PCT No.: PCT/JP2007/070725
§ 371 (c)(1),
(2), (4) Date: Oct. 10, 2008

(87) PCT Pub. No.: WO2008/053760
PCT Pub. Date: May 8, 2008

(65) Prior Publication Data
US 2009/0269259 A1 Oct. 29, 2009

(30) Foreign Application Priority Data

Oct. 31, 2006 (JP) .................. 2006-297035
Oct. 3, 2007 (JP) .................. 2007-259446

(51) Int. Cl.
*B01J 19/00* (2006.01)
*C01B 33/107* (2006.01)
(Continued)

(52) U.S. Cl.
CPC .......... *C01B 33/1071* (2013.01); *B01J 12/007* (2013.01); *B01J 19/02* (2013.01);
(Continued)

(58) Field of Classification Search
CPC .................... C01B 33/10757; C01B 3/10713; C01B 33/1071; B01J 19/243
(Continued)

(56) References Cited

U.S. PATENT DOCUMENTS 2,145,084 A   1/1939 Hersey
2,644,744 A   7/1953 Hartwig et al.
(Continued)

FOREIGN PATENT DOCUMENTS

EP   1 454 670 A1   9/2004
EP   1 775 263 A1   4/2007
(Continued)

OTHER PUBLICATIONS

Supplementary European Search Report for European Patent Application No. 07 83 0459.9 issued Dec. 21, 2010.
(Continued)

*Primary Examiner* — Jonathan Hurst
(74) *Attorney, Agent, or Firm* — Locke Lord LLP

(57) ABSTRACT

An apparatus for producing trichlorosilane, including: a reaction vessel in which a supply gas containing silicon tetrachloride and hydrogen is supplied to an internal reaction passageway to produce a reaction product gas containing trichlorosilane and hydrogen chloride; a heating mechanism that heats the interior of the reaction vessel; a gas supply section that supplies the supply gas in the reaction vessel; and a gas discharge section that discharges the reaction product gas from the reaction vessel to the outside, wherein the reaction passageway includes: a supply side passageway which is connected to the gas supply section at a central portion of the reaction vessel and flows the supply gas toward the outside while meandering in the reaction vessel; a return passageway which is connected to a downstream
(Continued)

end of the supply side passageway and extends to the central portion of the reaction vessel; and a discharge side passageway that is disposed so as to be connected to a downstream end of the return passageway and to adjoin the supply side passageway of the central portion of the reaction vessel, the discharge side passageway being connected to the gas discharge section.

20 Claims, 3 Drawing Sheets

(51) Int. Cl.
   *B01J 12/00* (2006.01)
   *B01J 19/02* (2006.01)
   *B01J 19/24* (2006.01)
(52) U.S. Cl.
   CPC ..... *B01J 19/243* (2013.01); *B01J 2219/00135* (2013.01); *B01J 2219/00155* (2013.01); *B01J 2219/0272* (2013.01); *C01B 33/10757* (2013.01)
(58) Field of Classification Search
   USPC .......................................................... 422/198
   See application file for complete search history.

(56) References Cited

U.S. PATENT DOCUMENTS

| | | | |
|---|---|---|---|
| 4,536,642 A | | 8/1985 | Hamster et al. |
| 4,668,493 A | | 5/1987 | Levin |
| 4,737,348 A | * | 4/1988 | Levin ............................ 422/199 |
| 5,906,799 A | | 5/1999 | Burgie et al. |

FOREIGN PATENT DOCUMENTS

| | | |
|---|---|---|
| FR | 656254 A | 5/1929 |
| JP | 57-012826 | 1/1982 |
| JP | 57-156318 | 9/1982 |
| JP | 60-122714 | 7/1985 |
| JP | 62-021706 | 1/1987 |
| JP | 62-123011 | 6/1987 |
| JP | 3781439 | 10/1994 |
| JP | 09-157073 | 6/1997 |
| WO | WO-2006081980 A2 | 8/2006 |

OTHER PUBLICATIONS

International Search Report mailed Jan. 29, 2008, issued on PCT/JP2007/070725.

* cited by examiner

APPARATUS FOR PRODUCING TRICHLOROSILANE

CROSS REFERENCE TO RELATED APPLICATIONS

This application is related to three co-pending applications: "APPARATUS FOR PRODUCING TRICHLOROSILANE" filed even date herewith in the names of Toshiyuki ISHI, Hideo ITO, Yuji SHIMIZU as a national phase entry of PCT/JP2007/070715 filed Oct. 24, 2007; "APPARATUS FOR PRODUCING TRICHLOROSILANE" filed even date herewith in the name of Toshiyuki ISHI, Hideo ITO, Yuji SHIMIZU as a national phase entry of PCT/JP2007/070644 filed Oct. 23, 2007; and "APPARATUS FOR PRODUCING TRICHLOROSILANE" filed even date herewith in the name of Toshiyuki ISHI, Hideo ITO, Yuji SHIMIZU as a national phase entry of PCT/JP2007/070843 filed Oct. 25, 2007; which applications are assigned to the assignee of the present application and all three incorporated by reference herein.

TECHNICAL FIELD

The present invention relates to an apparatus for producing trichlorosilane, which converts silicon tetrachloride into trichlorosilane.

This application claims priority on Japanese Patent Application No. 2006-297035, filed Oct. 31, 2006, and on Japanese Patent Application No. 2007-259446, filed Oct. 3, 2007, the disclosure of which is incorporated by reference herein.

BACKGROUND ART

Trichlorosilane ($SiHCl_3$), which is used as a raw material for the production of highly pure silicon (Si), can be produced by conversion through a reaction of silicon tetrachloride ($SiCl_4$: tetrachlorosilane) with hydrogen.

In other words, silicon is produced by the reductive reaction and the thermolysis reaction of trichlorosilane represented by reaction schemes (1) and (2) shown below, and trichlorosilane is produced by the conversion reaction represented by reaction scheme (3) shown below.

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 + HCl \quad (3)$$

As an apparatus for producing this trichlorosilane, for example, Patent Document 1 (Japanese Patent No. 3,781,439) proposes a reactor in which a reaction chamber surrounded by a heating element is of a dual chamber design having an outer chamber and an inner chamber formed by two concentrically positioned pipes, a supply gas of hydrogen and silicon tetrachloride is supplied to the reaction chamber from below via a heat exchanger disposed in the bottom of this reaction chamber, and a reaction product gas is discharged from the reaction chamber in a downward direction. In the heat exchanger in this reactor, the supply gas supplied to the reaction chamber is preheated by heat transferred from the reaction product gas discharged from the reaction chamber and the reaction product gas is cooled.

DISCLOSURE OF THE INVENTION

The following problems remain in the prior art described above.

In the above conventional apparatus for producing trichlorosilane, although the supply gas is preheated by heat exchange by the heat exchanger disposed in the bottom portion of the reaction chamber, there is a problem that the temperature of the reaction product gas discharged from the reaction chamber decreases and thus a sufficient effect of preheating the supply gas cannot be obtained. Also, there is a problem that it is necessary to dispose a separate heat exchanger outside the reactor, thus increasing the size of the entire apparatus and the cost of the apparatus.

The present invention has been made in the light of the above-described problems. An object of the present invention is to provide an apparatus for producing trichlorosilane, which can effectively preheat the supply gas by heat exchange with the reaction product gas, and can be reduced in the size and the cost of the entire apparatus.

The present invention employed the following constitution so as to solve the above problems. The apparatus for producing trichlorosilane of the present invention includes: a reaction vessel in which a supply gas containing silicon tetrachloride and hydrogen is supplied to an internal reaction passageway to produce a reaction product gas containing trichlorosilane and hydrogen chloride; a heating mechanism that heats the interior of the reaction vessel; a gas supply section that supplies the supply gas in the reaction vessel; and a gas discharge section that discharges the reaction product gas from the reaction vessel to the outside, wherein the reaction passageway includes: a supply side passageway that is connected to the gas supply section at a central portion of the reaction vessel and flows the supply gas toward the outside while meandering in the reaction vessel; a return passageway that is connected to a downstream end of the supply side passageway and extends to the central portion of the reaction vessel; and a discharge side passageway that is disposed so as to be connected to a downstream end of the return passageway and to adjoin the supply side passageway of the central portion of the reaction vessel, the discharge side passageway being connected to the gas discharge section.

In the supply side passageway in this apparatus for producing trichlorosilane, the supply gas flows from the central portion of the reaction vessel toward the outside while meandering and is converted to a reaction product gas while being heated. When the gas containing the reaction product gas flows through the discharge side passageway adjoining the supply side passageway after returning to the central portion of the reaction vessel by the return passageway, the supply gas is preheated by heat exchange between the supply gas flowing in the supply side passageway and the reaction product gas in a high-temperature state flowing in the discharge side passageway. Therefore, since this apparatus for producing trichlorosilane has a structure in which the reaction product gas in a high-temperature state is returned to the discharge side passageway adjoining the supply side passageway by the return passageway, heat exchange of the reaction product gas with the supply gas can be carried out while maintaining the reaction product gas in a high temperature state before discharge from the reaction vessel. Thus the supply gas can be efficiently preheated. Also, since the heat exchange mechanism is disposed inside the reaction vessel, it is not necessary to separately dispose a heat exchange mechanism outside the reaction vessel. Thus the size of the entire apparatus and cost of the apparatus can be reduced.

In the apparatus for producing trichlorosilane, the gas supply section may be a gas supply pipe and the gas discharge section may be a gas discharge pipe.

Also, the apparatus for producing trichlorosilane of the present invention may be provided with a plurality of the gas discharge sections, and the plurality of the gas discharge sections may be connected to a downstream end of the discharge side passageway. In this apparatus for producing trichlorosilane, since a plurality of gas discharge sections are connected to the downstream end of the discharge side passageway, it is possible to increase the cooling effect by dividing the discharge of the reaction product gas in a high-temperature state in a plurality of gas discharge sections. Thus, rapid cooling is ensured by making it possible to exchange heat between the outside and the plurality of sections. In the conversion reaction of silicon tetrachloride into trichlorosilane, reversal reaction occurs where the reaction product gas to be discharged is not cooled rapidly. The rate of conversion into trichlorosilane can be improved by rapidly cooling the reaction product gas through discharging from the plurality of gas discharge sections.

The members that form the reaction vessel of the apparatus for producing trichlorosilane may be formed of carbon.

The surface of the carbon of the apparatus for producing trichlorosilane may be coated with silicon carbide. Since the reaction vessel is formed of carbon coated with silicon carbide (SiC) in this apparatus for producing trichlorosilane, it is possible to set to a higher temperature compared to the case where the reaction vessel is formed of a pure carbon material. Thus, heat exchange with the reaction product gas of a higher temperature can be conducted and thus a high preheating effect can be obtained. Also, the production of impurities such as methane, methylchlorosilane, silicon carbide, and the like by the reaction of carbon with hydrogen, chlorosilane and hydrogen chloride (HCl) in the supply gas and the reaction product gas can be prevented and thus a highly pure trichlorosilane can be obtained.

The apparatus for producing trichlorosilane of the present invention may be provided with a storage container that stores the reaction vessel and the heating mechanism, and may be provided with an argon supply mechanism that supplies argon to the storage container. In this apparatus for producing trichlorosilane, since argon is supplied in the storage container by the argon supplying mechanism, leakage of the supply gas and the reaction product gas from the reaction vessel can be prevented by the periphery of the reaction vessel being in a pressurized state by argon. Thus, it is possible to prevent reaction of the supply gas and the reaction product gas which have leaked from the reaction vessel with carbon used in the reaction mechanism and the like outside the reaction vessel.

According to the present invention, the following effects are exerted.

According to the apparatus for producing trichlorosilane of the present invention, since the apparatus for producing trichlorosilane has a structure in which the reaction product gas in a high-temperature state is returned through the return passageway to the discharge side passageway adjoining the supply side passageway, it is possible to efficiently preheat the supply gas by heat exchange of the supply gas with the reaction product gas while maintaining the reaction product gas in a high-temperature state before discharging from the reaction vessel. Since the heat exchange mechanism is disposed inside the reaction vessel, it is possible to reduce the entire size of the apparatus and the cost of the apparatus. Therefore, it is possible to obtain a high trichlorosilane-conversion ratio with good heating efficiency using the small-sized low cost apparatus.

BEST MODE FOR CARRYING OUT THE INVENTION

An embodiment of the apparatus for producing trichlorosilane of the present invention will be described below with reference to FIG. 1 or 2.

Figure 1:
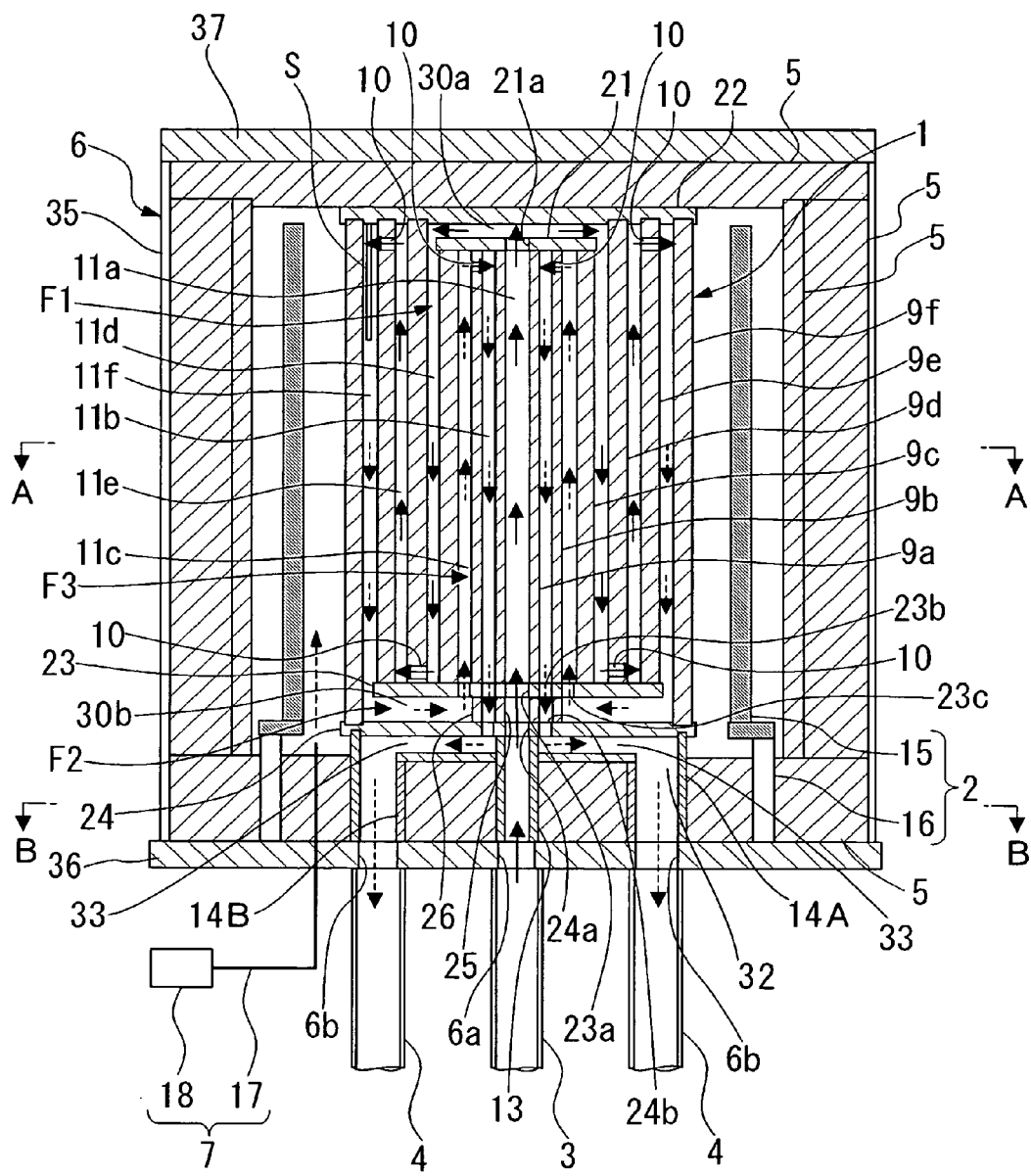
FIG. 1 is a schematic sectional view showing an embodiment of an apparatus for producing trichlorosilane of the present invention.

As shown in FIG. 1, the apparatus for producing trichlorosilane of the present embodiment includes a reaction vessel 1 in which a supply gas containing silicon tetrachloride and hydrogen is supplied to an internal reaction passageway to produce a reaction product gas containing trichlorosilane and hydrogen chloride; a heating mechanism 2 disposed in the periphery of the reaction vessel 1 for heating the reaction vessel 1 from the outside; a gas supply pipe 3 for supplying the supply gas in the reaction vessel 1; a plurality of gas discharge pipes 4 for discharging the reaction product gas from the reaction vessel 1 to the outside; a heat insulating material 5 disposed so as to cover the periphery of the reaction vessel 1 and the heating mechanism 2; a storage container 6 for storing the reaction vessel 1, the heating mechanism 2 and the heat insulating material 5; and an argon supplying mechanism 7 for supplying argon (Ar) in the storage container 6.

The reaction passageway in the reaction vessel 1 includes a supply side passageway F1 which is connected to the gas supply pipe 3 at a central portion of the reaction vessel 1 and flows the supply gas toward the outside while meandering up and down in the reaction vessel 1, a return passageway F2 which is connected to a downstream end of the supply side passageway F1 and which returns the generated reaction product gas to the central portion of the reaction vessel 1, and a discharge side passageway F3 which is disposed so as to be connected to the downstream end of the return passageway F2 and to adjoin the supply side passageway F1 disposed in the central portion of the reaction vessel 1.

Figure 2:
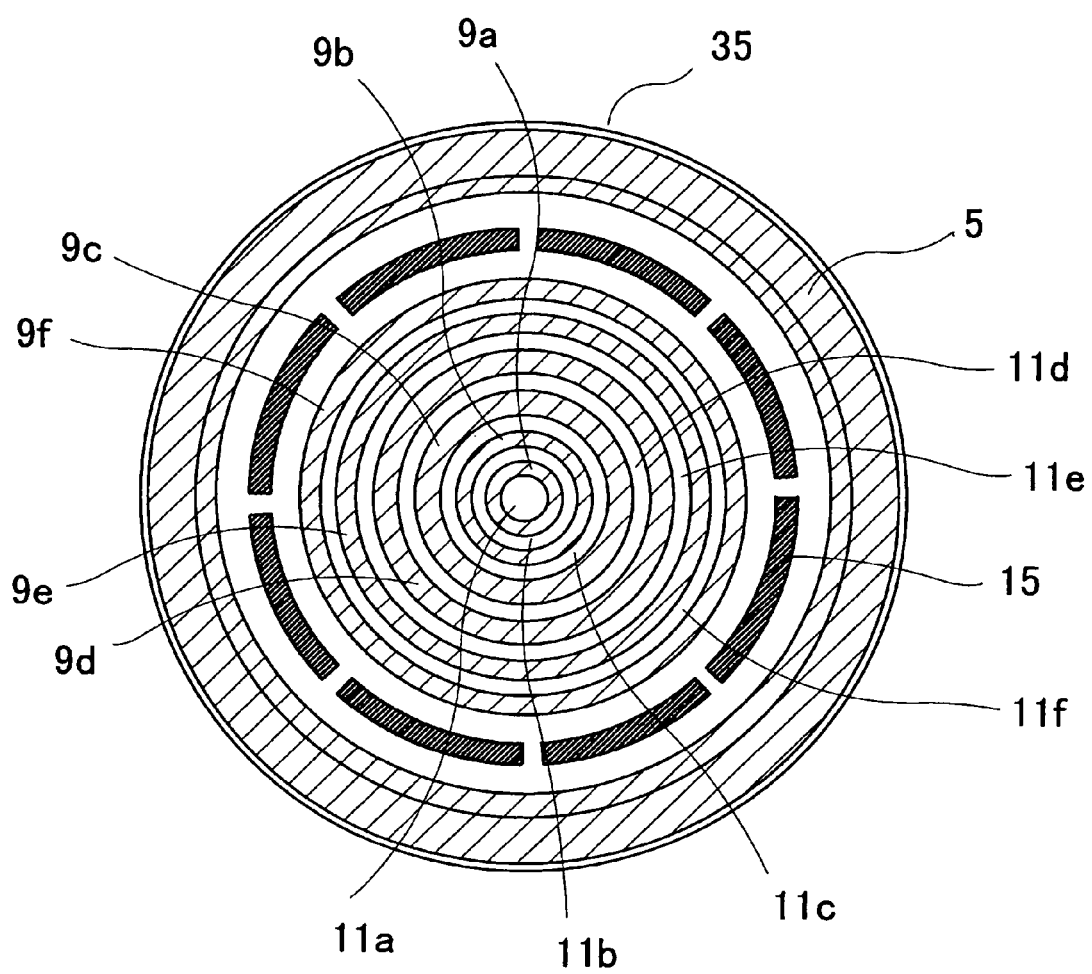
FIG. 2 is a sectional view taken along the line A-A in FIG. 1.

As shown in FIGS. 1 and 2, in order to form the reaction passageways F1 to F3, the reaction vessel 1 is provided with cylindrical first to sixth reaction tubular walls 9a to 9f which have different inner diameters and are concentrically disposed in order from the inside; a first upper circular plate 21 for supporting the tops of the first to third reaction tubular walls 9a to 9c; a second upper circular plate 22 for supporting the tops of the fourth to sixth reaction tubular walls 9d to 9f; a first lower circular plate 23 for supporting the bottoms of the first to fifth reaction tubular walls 9a to 9e; a second lower circular plate 24 for supporting the bottom of the sixth reaction tubular wall 9f; and a first spacer member 25 and a second tubular spacer member 26 for supporting the first lower circular plate 23 on the second lower circular plate 24, the spacer members 25 and 26 having the same diameter and center axis as the first reaction tubular wall 9a and the second reaction tubular wall 9b respectively.

The first to sixth reaction tubular walls 9a to 9f partition a majority of the internal space of the reaction vessel 1 into a central columnar small space 11a and a plurality of tubular small spaces 11b to 11f in the periphery thereof.

The first upper circular plate 21 has a diameter smaller than the second upper circular plate 22 and is provided below the second upper circular plate 22 with a predetermined space therebetween. A horizontal small space 30a is formed between both of these upper circular plates 21 and 22. Also, the first lower circular plate 23 has a diameter smaller than the second lower circular plate 24 and is disposed above the second lower circular plate 24 interposing the first tubular spacer member 25 and the second tubular spacer member 26 so that there is a predetermined space provided therebetween. A horizontal small space 30b is formed between both of these lower circular plates 23 and 24.

A first central hole 23a and a second central hole 24a are formed in the first lower circular plate 23 and the second lower circular plate 24 respectively. The small space 11a on the inside of the first reaction tubular wall 9a is in communication with the first tubular spacer member 25 and an after-mentioned supply connection pipe 13 via these first central hole 23a and second central hole 24a. Also, a third central hole 21 is formed in the first upper circular plate 21 and the small space 11a inside the first reaction tubular wall 9a is in communication with this third central hole 21a. This small space 11a is in a communicative state with the horizontal small space 30a between both of the upper circular plates 21 and 22.

A plurality of first through-holes 23b are formed in the circumferential direction on the outer circumference side of the first central hole 23a and a plurality of second through-holes 23c are formed in the circumferential direction more on the outer circumference side than these first through-holes 23b in the first lower circular plate 23. A plurality of third through-holes 24b are formed in the circumferential direction on the outer circumference side of the second central hole 24a in the second lower circular plate 24.

A plurality of flow through-holes 10 are formed in the circumferential direction in upper portions of the second reaction tubular wall 9b and the fifth reaction tubular wall 9e. Also, a plurality of flow through-holes 10 are formed in the circumferential direction in a lower portion of the fourth reaction tubular wall 9d.

Figure 3:
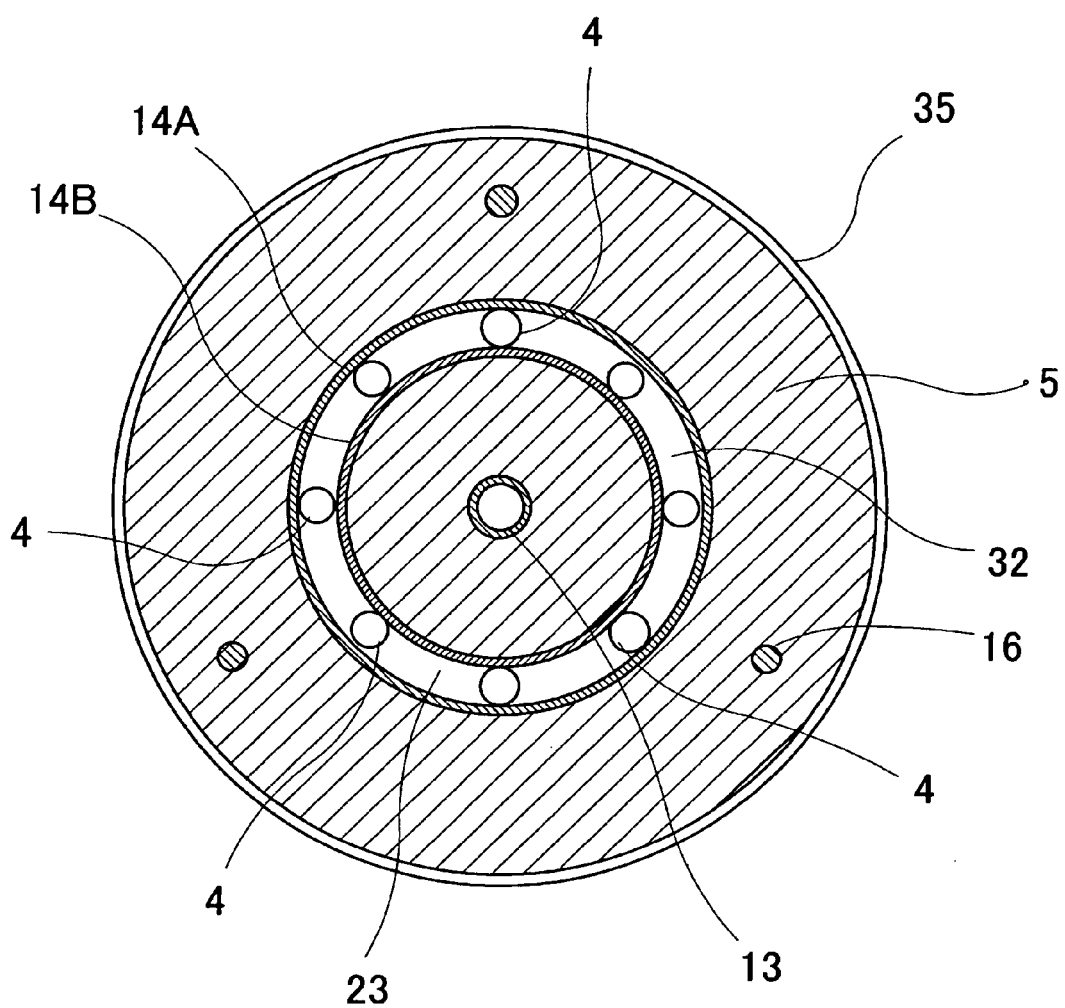
FIG. 3 is a sectional view taken along the line B-B in FIG. 1.

The gas supply pipe 3 and gas discharge pipe 4 are in communication with a supply hole 6a and a discharge hole 6b formed in the bottom of the storage container 6 respectively, while the top ends thereof are fixed to the bottom of the storage container 6. A supply connection pipe 13 is disposed in a central portion of the storage container 6 by penetrating the heat insulating material 5 in the bottom of this storage container and, as shown in FIGS. 1 and 3, two tubular bodies 14A and 14B which penetrate the heat insulating material 5 are disposed in concentricity with this supply connection pipe 13. Between these tubular bodies 14A and 14B is formed a tubular discharge connection passageway 32. Also, the upper end openings of the supply hole 6a and the discharge hole 6b are in communication with the lower end openings of the supply connection pipe 13 and the discharge connection passageway 32 respectively.

The supply connection pipe 13 supports a central lower surface of the second lower circular plate 24 on the upper end thereof and the upper end opening of the supply connection pipe 13 is in communication with the second central hole 24a. Among the tubular bodies 14A and 14B which form the discharge connection passageway 32, the outside tubular body 14A is formed longer than the inside tubular body 14B. An outer end portion of the second lower circular plate 24 is placed on top of this outside tubular body 14A and a horizontal passageway 33 is formed below this second lower circular plate 24. With such constitution, the upper end opening of the discharge connection passageway 32 communicates with the third through-hole 24b via this horizontal passageway 33.

As shown in FIG. 3, eight of the gas discharge pipes 4 are disposed at equal intervals in the circumferential direction of the discharge connection passageway 32.

A supply source (not shown) of the supply gas is connected to the gas supply pipe 3. Although the reaction product gas is discharged from the gas discharge pipe 4 to the outside by the pressure gradient in the pipe, a discharge pump may be connected to the gas discharge pipe 4.

With respect to each of the members forming the reaction vessel 1, in this embodiment, the first to sixth reaction tubular walls 9a to 9f, the first upper circular plate 21, the second upper circular plate 22, the first lower circular plate 23, the second lower circular plate 24, the first tubular spacer member 25, the second tubular spacer member 26, and the like are formed of carbon and the surface of the carbon is coated with silicon carbide.

The storage container 6 is constituted of a tubular wall 35, and a bottom plate 36 and a ceiling plate 37 which block both ends thereof, and is made of stainless steel.

The heating mechanism 2 is provided with a heater 15, which is a heating element, in the periphery of the reaction vessel 1 so as to enclose the reaction vessel 1 and with an electrode 16, which is connected to the bottom of the heater 15 and is for flowing an electric current to the heater 15. This electrode 16 is connected to a power supply (not shown). The heater 15 is formed of carbon. Also, the heating mechanism 2 carries out heating control so that the temperature inside the reaction vessel 1 becomes a temperature in the range from 800 to 1,400° C. If the temperature inside the reaction vessel 1 is set to 1,200° C. or higher, the conversion ratio is improved. Also, disilanes may be introduced to recover silanes.

The heat insulating material 5 is formed of, for example, carbon, and is fixed to the inner wall surface of the tubular wall 35, the upper surface of the bottom plate 36, and the lower surface of the ceiling plate 37 of the storage container 6 so as to be pasted inside the storage container 6.

A temperature sensor S which protrudes into the outermost small space 11f in the reaction passageways F1 to F3 is fixed to the lower surface of the second upper circular plate 2. The temperature is controlled by the heating mechanism 2 while the temperature is measured by this temperature sensor S.

The argon supply mechanism 7 is provided with an argon supply pipe 17, the tip end thereof protruding into the storage container 6 by penetrating the bottom of the storage container 6 and the heat insulating material 5, and with an argon supply source 18 which is connected to the argon supply pipe 17. This argon supply mechanism 7 carries out argon supply control so that inside of the storage container becomes a predetermined pressurized state. A container pump (not shown) for carrying out replacement of the inside atmosphere or argon exhaustion is connected to the top of the storage container 6.

The flow of the gas in the apparatus for producing trichlorosilane of the present embodiment will be described below with reference to FIG. 1.

First, a supply gas introduced from the gas supply pipe 3 via the supply connection pipe 13 flows, via the inside space of the first tubular spacer member 25, in an upper direction in the small space 11a inside the first reaction tubular wall 9a. After flowing, via the second central hole 21a of the first upper circular plate 21, to the horizontal small space 30a between the first upper circular plate 21 and the second upper circular plate 22, the supply gas flows in a downward direction in the outside tubular small space 11d between the third reaction tubular wall 9c and the fourth reaction tubular wall 9d.

Next, via the flow through-holes 10 of the fourth reaction tubular wall 9d, the supply gas moves to the outer tubular small space 11e between the fourth reaction tubular wall 9d and the fifth reaction wall 9e and flows in an upward direction. The supply gas moves from the flow through-holes 10 of the fifth reaction tubular wall 9e to the outermost small space 11f between the fifth reaction tubular wall 9e and the sixth reaction tubular wall 9f and flows in a downward direction. In other words, the passageway formed from the inside space of the first tubular spacer member 25, the small space 11a inside the first reaction tubular wall 9a, the horizontal small space 30a between the upper circular plate 21 and the upper circular plate 22, the three tubular small spaces 11d to 11f formed by the third reaction tubular wall 9c to the sixth reaction tubular wall 9f, and the flow through-holes which communicate the tubular small spaces 11d to 11f constitute the supply side passageway F1. The supply gas is converted to the reaction product gas by being heated during flowing.

Therefore, it is set so that the supply gas supplied to the small space 11a inside the first reaction tubular wall 9a becomes a reaction product gas by reaction while being heated and sequentially flowing to the outside via a plurality of flow through-holes 10, and the like. In accordance with movement in the radial direction in this supply side passageway F1, by the gas flowing between the flow through-holes 10 disposed alternately up and down, it is set so that the flow direction of the gas repetitively changes between the upward direction and the downward direction. In the drawing, the flow direction of the gas is indicated by arrows.

Next, the produced reaction product gas returns from the small space 11f between the fifth reaction tubular wall 9e and the sixth reaction tubular wall 9f to the central portion of the reaction vessel 1 by passing the horizontal small space 30b between the first lower circular plate 23 and the second lower circular plate 24. In other words, the small space 30b between the first lower circular plate 23 and the second lower circular plate 24 constitutes the return passageway F2. The reaction product gas is introduced into the small space 11c between the second reaction tubular wall 9b and the third reaction tubular wall 9c via the second through-hole 23c in the first lower circular plate 23, and flows in an upward direction.

In this time, via the third reaction tubular wall 9c, heat exchange is carried out between the reaction product gas and the supply gas flowing in the adjoining small space 11d between the third reaction tubular wall 9c and the fourth reaction tubular wall 9d.

Next, the reaction product gas flows into the small space 11b between the first reaction tubular wall 9a and the second reaction tubular wall 9b via the flow through-holes 10 in the second reaction tubular wall 9b, and flows in a downward direction. In this case, heat exchange is carried out, via the first reaction tubular wall 9a, between the reaction product gas and the supply gas flowing in the adjoining small space 11a inside the first reaction tubular wall 9a. In other words, the discharge side passageway F3 is constituted from both of the small spaces 11c between the second reaction tubular wall 9b and the third reaction tubular wall 9c, and 11b between the first reaction tubular wall 9a and the second reaction tubular wall 9b, respectively, and the communication through-holes 10 which communicate these small spaces 11c and 11b.

After that, the reaction product gas flows through the first through-hole 23b in the first lower circular plate 23, interstitial space between the first tubular spacer member 25 and the second tubular spacer member 26, the third through-hole 24b in the second lower circular plate 24, the horizontal passageway 33, the discharge connection passageway 32, and the exhaust hole 6b in order, and is discharged to the outside from a plurality of the gas discharge pipes 4, Thus, in the present embodiment, in the supply side passageway F1, the supply gas flows from the central portion of the reaction vessel 1 toward the outside while meandering (zigzagging) up and down and while being heated, and the supply gas is converted to the reaction product gas. After the reaction product gas returns to the central portion of the reaction vessel 1 through the return passageway F2, the reaction product gas flows in the discharge side passageway F3 adjoining the supply side passageway F1. In this time, the supply gas is preheated by heat exchange being carried out between the supply gas flowing in the supply side passageway F1 and the reaction product gas in a high-temperature state flowing in the discharge side passageway F3.

Therefore, since this apparatus for producing trichlorosilane has a structure in which the reaction product gas in a high-temperature state is returned through the return passageway F2 to the discharge side passageway F3 adjoining the supply side passageway F1, heat exchange of the reaction product gas maintained in a high-temperature state with the supply gas can be conducted before discharge from the reaction vessel 1 and thus the supply gas can be efficiently preheated. Also, since a heat exchange mechanism is disposed in the reaction vessel 1, it is not necessary to separately dispose a heat exchange mechanism outside the reaction vessel and thus the size of the entire apparatus and the cost of the apparatus can be reduced.

Since a plurality of the gas discharge pipes 4 are connected to the downstream end of the discharge side passageway F3, rapid cooling can be conducted by discharging the reaction product gas in a high-temperature state from the gas discharge pipes 4 which exhibit a high cooling effect by heat exchange with the outside using a plurality of pipes. In other words, by rapidly cooling the reaction product gas by discharging the gas from a plurality of the gas discharge pipes 4, the reverse reaction of conversion is suppressed and thus the trichlorosilane-conversion ratio can be improved.

Furthermore, since the reaction vessel 1 is formed of carbon coated with silicon carbide (SiC), it is possible to set to a higher temperature compared to the case where the reaction vessel is formed of a pure carbon material. Thus, heat exchange with a higher temperature reaction product gas can be conducted and thus a high preheating effect can be obtained. Also, the production of impurities such as methane, methylchlorosilane, silicon carbide, and the like by the reaction of carbon with hydrogen, chlorosilane and hydrogen chloride (HCl) in the supply gas and the reaction product gas can be prevented and thus a highly pure trichlorosilane can be obtained.

Thermal expansion of each of the reaction tubular walls 9a to 9f occurs by heating from the heating mechanism 2. In this case, since the heating mechanism 2 is disposed on the outside, the reaction tubular wall 9f on the outside tends to be the most heated and have the largest thermal expansion. However, the reaction product gas that has become a high temperature is returned through the return passageway F2 to the discharge side passageway F3 adjoining the supply side passageway F1, and there is heat exchange between the gases flowing in both passageways. Therefore, it is possible to reduce the temperature difference in the radial direction and thus it is possible to reduce the heat strain which occurs in the constitutional members of the reaction vessel 1 (in particular, both upper circular plates 21 and 22, and both lower circular plates 23 and 24 disposed in a radial direction).

In the example shown in FIG. 1, the second upper circular plate 22 disposed on the upper end of the reaction tubular walls 9d to 9f on the outside is in a state of contacting the heat insulating material 5. Thus, the thermal expansion force of the reaction tubular walls 9d to 9f directly acts on the heat insulating material 5. This heat insulating material 5 is made to have cushioning property for absorbing the thermal expansion of the tubular walls. Alternatively, considering the allowance of thermal expansion of the reaction tubular walls 9d to 9f, a clearance may be disposed between the heat insulating material 5 and the second upper circular plate 22.

Also, since argon is supplied to the storage container 6 by the argon supplying mechanism 7, leakage of the supply gas and the reaction product gas from the reaction vessel 1 can be prevented by the periphery of the reaction vessel being in a pressurized state by argon. Thus, it is possible to prevent reaction of the supply gas and the reaction product gas which have leaked from the reaction vessel 1 with carbon used in the heating mechanism 2 and the like outside the reaction vessel 1.

When argon is supplied as a purge gas, since argon is supplied from the bottom of the storage container 6 by the argon supply mechanism 7, natural convection occurs in an upward direction by heating by the heater 15. Also, by suction from a container pump connected to the top of the storage container 6, a high purge effect can be obtained by the purge gas flowing out smoothly from the bottom to the top.

The technical scope of the present invention is not limited to the above embodiments and various modifications which do not depart from the spirit of the present invention can be added.

For example, while six first to sixth reaction tubular walls 9a to 9f were used in the above embodiments, a number of reaction tubular walls other than six may be used. When the number of reaction tubular walls is large, whereas the energy efficiency increases because of the increased heat transfer area, the heating efficiency decreases since it becomes difficult to transfer the radiant heat from the heating mechanism to the inside. Thus, an appropriate number of reaction tubular walls are disposed according to gas flow amount and the size of the entire apparatus.

Also, a cooling mechanism may be added by forming a refrigerant passageway for the flowing of a refrigerant such as water inside the wall of the storage container 5.

Furthermore, the flow through-holes 10 in both reaction tubular walls which form cylindrical surfaces between the walls, may be formed in not only up and down positions but in the circumferential direction so as to be dislocated with each other. In this situation, the passageway between the flow through-holes 10 can be made longer. Also, they do not have to be through-holes and may be flow penetration sections by notches formed in the upper end portion or the lower end portion of the reaction tubular walls.

In the above embodiments, the discharge connection passageway 32 is formed between a pair of pipe bodies 14A and 14B. Alternatively, in a double pipe arrangement, one pipe body may be disposed so as to surround a periphery of the supply connection pipe 13, forming the discharge connection passageway therebetween. In this case, a discharge pipe may also be formed to surround a periphery of the gas supply pipe 3 in a double pipe arrangement.

Also, in the above embodiments, the position of the gas supply pipe 3 and the gas discharge pipe 4 may be disposed oppositely and by a similar apparatus structure, the gas flow may be opposite by exchanging the entrance and the exit of the gas.

INDUSTRIAL APPLICABILITY

According to the apparatus for producing trichlorosilane of the present invention, it is possible to efficiently preheat the supply gas by heat exchange between the supply gas and the reaction product gas maintained in a high-temperature state. Also, the entire size of the apparatus and the cost of the apparatus can be reduced since a heat exchange mechanism is disposed in the reaction vessel. Therefore, it is possible to obtain a high trichlorosilane-conversion ratio with good heating efficiency using a small and low cost apparatus.

The invention claimed is:

1. An apparatus for producing trichlorosilane, comprising:
    a reaction vessel in which a supply gas containing silicon tetrachloride and hydrogen is supplied to an internal reaction passageway to produce a reaction product gas containing trichlorosilane and hydrogen chloride;
    a heating mechanism including a heater that is disposed outside the reaction vessel, encloses the reaction vessel, and heats the interior of the reaction vessel;
    a gas supply section that supplies the supply gas in the reaction vessel and is formed only at a center of the reaction vessel; and
    a plurality of gas discharge sections that each section separately discharges the reaction product gas from the reaction vessel to the outside and are concentrically disposed with the heater and the gas supply section,
    wherein
    the reaction passageway includes:
    a supply side passageway that is connected to the gas supply section at a central portion of the reaction vessel and flows the supply gas toward the outside while meandering in the reaction vessel, where an outlet of the supply side passageway is at outermost and a bottom of the reaction vessel;
    a return passageway that is connected to a downstream end of the supply side passageway and extends to the central portion of the reaction vessel; and
    a discharge side passageway that is disposed so as to be connected to a downstream end of the return passageway and to adjoin the supply side passageway of the central portion of the reaction vessel, the discharge side passageway being connected to the plurality of gas discharge sections,
    wherein the gas supply section and the plurality of gas discharge sections are connected to an inlet and the outlet of the reaction passageway, respectively, and
    wherein the reaction vessel includes a plurality of reaction tubular walls that are disposed concentrically with the heater and the gas supply section and constitute a columnar space and a plurality of tubular spaces so as to form the reaction passageway.

2. The apparatus for producing trichlorosilane according to claim 1,
    wherein the plurality of gas discharge sections are connected to a downstream end of the discharge side passageway.

3. The apparatus for producing trichlorosilane according to claim 1, wherein a member forming the reaction vessel is formed of carbon.

4. The apparatus for producing trichlorosilane according to claim 3, wherein a surface of the carbon is coated with silicon carbide.

5. The apparatus for producing trichlorosilane according to claim 1, comprising:
   a storage container that stores the reaction vessel and the heating mechanism, and
   an argon supply mechanism that supplies argon in the storage container.

6. The apparatus for producing trichlorosilane according to claim 3, comprising:
   a storage container that stores the reaction vessel and the heating mechanism, and
   an argon supply mechanism that supplies argon in the storage container.

7. The apparatus for producing trichlorosilane according to claim 4, comprising:
   a storage container that stores the reaction vessel and the heating mechanism, and
   an argon supply mechanism that supplies argon in the storage container.

8. The apparatus for producing trichlorosilane according to claim 2, wherein a member forming the reaction vessel is formed of carbon.

9. The apparatus for producing trichlorosilane according to claim 8, wherein a surface of the carbon is coated with silicon carbide.

10. The apparatus for producing trichlorosilane according to claim 2, comprising:
    a storage container that stores the reaction vessel and the heating mechanism, and
    an argon supply mechanism that supplies argon in the storage container.

11. The apparatus for producing trichlorosilane according to claim 8, comprising:
    a storage container that stores the reaction vessel and the heating mechanism, and
    an argon supply mechanism that supplies argon in the storage container.

12. The apparatus for producing trichlorosilane according to claim 9, comprising:
    a storage container that stores the reaction vessel and the heating mechanism, and
    an argon supply mechanism that supplies argon in the storage container.

13. The apparatus for producing trichlorosilane according to claim 1, wherein the plurality of gas discharge sections are disposed to support the reaction vessel.

14. The apparatus for producing trichlorosilane according to claim 1, wherein
    the return passageway is a horizontal small space; and
    the discharge side passageway is enclosed by the supply side passageway.

15. The apparatus for producing trichlorosilane according to claim 14, wherein
    the discharge side passageway includes tubular spaces which flow the reaction product gas up and down.

16. The apparatus for producing trichlorosilane according to claim 1,
    wherein the supply side passageway is configured to flow the supply gas from the bottom of the reaction vessel to a top of the reaction passageway, sequentially from the central portion of the reaction vessel towards further outside in a radial direction, sequentially from the top of the reaction passageway towards the bottom of the reaction vessel, sequentially towards outside in the radial direction, sequentially towards the top of the reaction passageway, sequentially towards further outside in the radial direction, and sequentially towards the bottom of the reaction vessel, and
    wherein the discharge side passageway is configured to flow the supply gas towards the top of the reaction passageway, sequentially towards the central portion of the reaction vessel, and sequentially towards the bottom of the reaction vessel.

17. The apparatus for producing trichlorosilane according to claim 1,
    wherein the supply side passageway is disposed so that the outermost periphery of the supply side passageway is heated by the heater.

18. The apparatus for producing trichlorosilane according to claim 1,
    wherein the discharge side passageway adjoins and is separated from the supply side passageway by the reaction tubular walls disposed innermost side of the reaction vessel.

19. The apparatus for producing trichlorosilane according to claim 1,
    wherein the discharge side passageway adjoins and is parallel to the supply side passageway.

20. The apparatus for producing trichlorosilane according to claim 1,
    wherein the discharge side passageway and the supply side passageway are configured so as to perform heat-exchange with each other via the reaction tubular walls disposed innermost side of the reaction vessel.

* * * * *